United States Patent Office 3,298,969
Patented Jan. 17, 1967

---

3,298,969
PROCESS OF PREPARING GRAFT COPOLYMERS FOR ION EXCHANGE AND CHELATING PURPOSES
Gaetano F. D'Alelio, South Bend, Ind., assignor, by direct and mesne assignments, to Metal Recovery Systems, Cleveland, Ohio
No Drawing. Filed May 12, 1960, Ser. No. 28,562
17 Claims. (Cl. 260—2.1)

This invention relates to a new process for the production of graft copolymers. Generally, it deals with the production of graft copolymers using peroxidized polymers, absorbing on the polymer the monomer to be grafted suspending the monomer-polymer mixture in a liquid non-reactive medium which is a non-solvent for the polymer, including aqueous dispersions, and heating the mixture to graft the monomer to the polymer.

An object of this invention is to provide an improved process for the preparation of resins for ion exchange and chelating purposes.

Another object of this invention is to provide ion exchange resins and chelating resins in which the functional groups are more uniformly and effectively distributed for their ultimate functions.

The peroxidized polymers to which the monomers are to be grafted by the process of this invention can be prepared in numerous ways. Method A comprises irradiating a performed polymer in the presence of oxygen or air to form polymer peroxides and diperoxides simultaneously with crosslinking of the polymer. Such polymeric peroxides are relatively stable at ordinary temperatures but decompose at high temperatures to form macroradicals. When the decomposition is performed in the presence of a monomer, graft copolymers are obtained. If the grafting is performed while the polymer is immersed directly in the monomer, or a solution of considerable concentration thereof, non-uniform grafting and attachment of the grafting monomer occurs. Lengthy sidechains of the grafted polymer are obtained. In some cases a fewer number of longer sidechains are formed, spread non-uniformly through the preformed polymer. When the preformed polymer is removed from the monomer solution and grafting is effected in air or other gaseous media, some of the monomer escapes by evaporation, and also uniform heating is difficult to control, which conditions result in non-uniform grafting.

It has now been found that, in accordance with this invention, improved results are obtained by effecting the grafting while the peroxidized polymer is suspended with absorbed or adhered monomer in a liquid medium in which the polymer is insoluble. In this manner, modified polymers with a variety of properties can be readily prepared. For example, a polyolefin fiber, such as polyethylene or polypropylene can be surface grafted readily with acrylonitrile to give fibers with improved resistance to aromatic hydrocarbon solvents. Also, by the process of this invention, by grafting a monomer having coordination groups, chelating resins can be prepared readily and economically. When a monomer having ionic acidic or basic groups is grafted to a crosslinked peroxidized polymer by the process of this invention, then an economical synthesis of tough ion exchange resins is achieved. In such products the inner core of the fiber, bead, etc., will be of tough polyolefin and the concentrated ion exchange or chelating groups will be concentrated on the outer surface.

In those polymers which are not crosslinked readily by irradiation, a small amount of a crosslinking monomer, more fully defined hereinafter, can be added to the polymer before irradiation or can be admixed with the monomer to be grafted, to assure crosslinking of the entire mass when crosslinked compositions are desired. It is preferred generally for ion exchange and chelating purposes that the polymer be crosslinked before grafting.

Thus, to ilustrate the process of Method A, the preformed polymer of a monomer, M, is irradiated in the presence of oxygen, advantageously in the presence of a crosslinking monomer. There is obtained a crosslinked peroxidized polymer having structures represented as

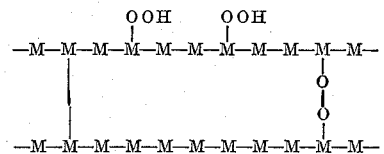

When a monomer, B′, is grafted to the polymer there is obtained a grafted polymer, thus

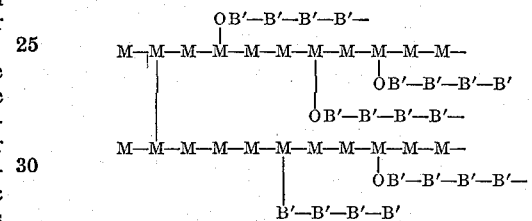

Using an ethylene polymer with styrene as grafting monomer, B′, the grafted copolymer can be represented as

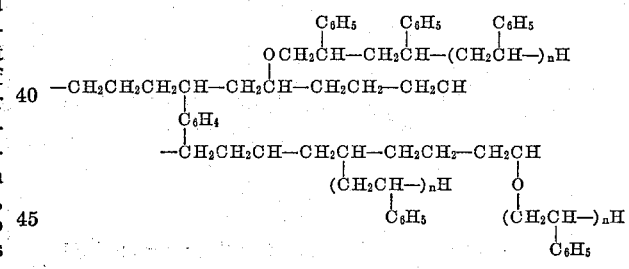

Method B for preparing the peroxidized polymers suitable for grafting by the process of this invention comprises reacting a polymer or copolymer having an acyl halide group with an alkyl hydroperoxide to form perester groups in the polymer and thereafter grafting a monomer to the peroxidized polymer as described under the process of Method A. For example,

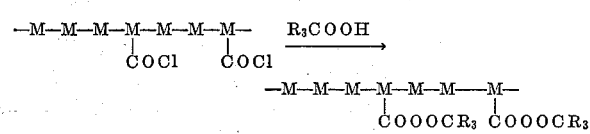

in which M represents a monomer and $R_3COOH$ represents an alkyl hydroperoxide wherein R is a hydrocarbon group and at least one R group is a lower alkyl or aryl group. Thus, when the polymeric composition is a divinylbenzene-crosslinked copolymer of styrene and acrylyl chloride and this is reacted with tertiary butyl hydroperoxide, there is obtained a copolymer containing structures such as

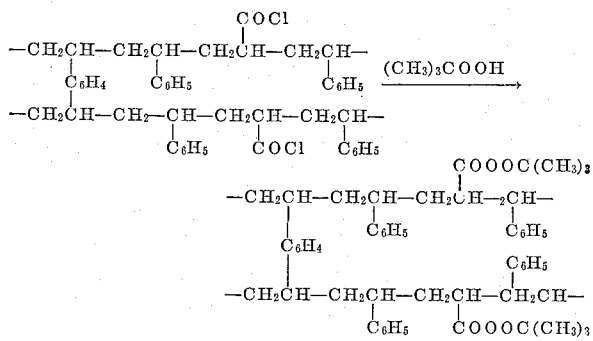

to which is grafted another monomer by the process of this invention.

Method C for producing the crosslinked peroxidized polymers useful in the grafting process of this invention comprises reacting a polymer or copolymer having secondary alkyl groups with peroxidized compounds such as per-acids, peresters, per-anhydrides, etc. For example, a crosslinked polymer of monomer, M, can be reacted as follows:

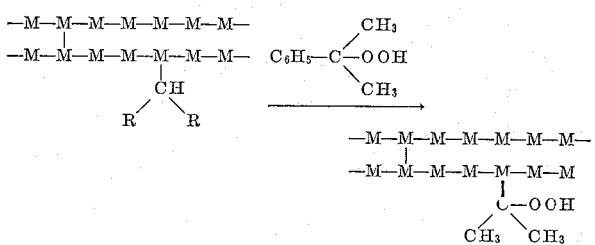

Thus, when the polymer is a divinylbenzene-crosslinked styreneisopropylstyrene copolymer, the peroxidized polymer will have units such as

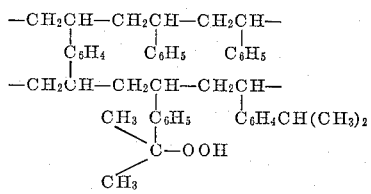

If the polymer contains isopropyl acrylate instead of isopropylstyrene, the peroxidized group will be

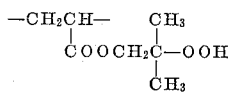

Then other monomers can be grafted to these peroxidized polymers as described above.

Method D for preparing peroxidized polymers especially suited for the practice of this invention comprises polymerizing a vinyl or vinylidene monomer together with a crosslinking monomer in the presence of oxygen whereby a crosslinked, internally peroxidized network is obtained. Thus if the monoethylenic monomer is represented by styrene and the divinylbenzene represents the crosslinking monomer, there are obtained structures of the type

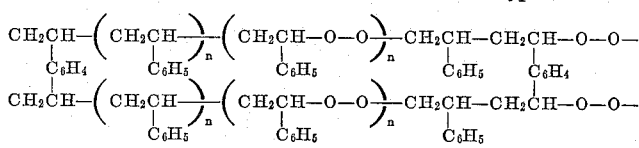

to which other monomers can be grafted readily by the practice of this invention.

Styrene is illustrative of monovinyl and monovinylidene compounds that can be used in Method D, such as the acrylates, the methacrylates, the vinyl halides, the vinyl esters, the itaconic esters, the alkyl styrenes, etc., whereas divinylbenzene is illustrative of crosslinking monomers, that is, monomers having a plurality of polymerizable groups, such as hereinafter enumerated as useful also for modifying polymers during irradiation or for cografting with other monomers to peroxidized polymers. In preparing the internally peroxidized crosslinked polymers for grafting, where a high degree of crosslinking is desired, use of higher amounts of crosslinking monomer, and in some cases use of only the crosslinking monomer is advantageous to prepare the crosslinked internally peroxidized polymer on which to graft other monomers.

Besides divinylbenzene, many other crosslinking agents can be used, as explained above, in the practice of this invention, a few illustrative examples of which are liquid and low molecular weight polybutadienes, divinylnaphthalene, vinyl isopropenyl benzene, diallyl benzene, etc.; the polyunsaturated esters, such as ethylene glycol dimethacrylate, trimethylene glycol dimethacrylate, ethylene glycol diacrylate, diallyl itaconate, glyco maleate, etc.; diallyl succinate, divinyl phthalate, diallyl maleate, diallyl fumarate; the polyunsaturated ethers, such as divinyl ether, trimethylene glycol divinyl ether, etc.; vinyl-phenyl acrylate, 2-isopropenyl-5-acryloxynaphthalene, vinyl-3,5-diallyloxypalmitate, etc.

In accordance with this invention, the polyfunctional vinyl- and vinylidene compounds of the types enumerated above can be grafted to peroxidized crosslinked polymers. However, for most applications the monovinyl monomers are preferred, such as vinyl chloride, vinyl acetate, vinyl propionate, vinyl oleate, acrylonitrile, methacrylonitrile, vinylidene cyanide, alpha-chloroacrylonitrile, acrylic acid, and the acrylic esters, such as methyl, ethyl, propyl, butyl, etc., acrylates; methacrylic acid and its esters, such as the methyl, ethyl, propyl, butyl, hexyl, phenyl, etc., esters; itaconic anhydride, its monoacid esters, and diesters, such as the methyl, ethyl, propyl, etc., esters; the acrylic, methacrylic, itaconic, chloroacrylic, and alpha-cyanoacrylic amides and their N-alkyl amides; the alkenyl aryl compounds, such as styrene, the monomethyl styrenes, the dimethyl styrenes, alpha-methyl styrene, the mono-, di-, and tri-chlorostyrenes, the o-, m-, p-nitrostyrenes, the o-, m-, p-acetamidostyrenes, vinyl naphthalene, vinylcarbazole, etc.; the alkenyl aryl heterocyclic compounds, such as vinyl pyridine, vinyl methyl pyridine, vinyl quinoline; the diene-1,3 compounds, such as butadiene-1,3, isoprene, 2,3-dimethylbutadiene-1,3, chloroprene, 2-phenylbutadiene-1,3, methyl vinyl ketone, ethyl vinyl ketone, methyl isopropenyl ketone, N-vinyl imidazole, the vinyl azlactones, the N-vinyl-2-oxazolidinones, vinyl-catechol diacetate, the N-vinyl-pyrrolidones, acrylyl-lysine, methacrylyl-lysine, acrylyl quanamine, vinyl phenyl glycidyl ethers, isopropenylphenylglycidyl ether, glycidyl acrylate, glycidyl methacrylate, divinylbenzene monoxide, acryloxyethyliminoacetic acid and its lower esters, such as the methyl, ethyl, propyl ester, etc., vinylbenzyl chloride, the vinylbenzylaminoacetic acids and esters, etc. All of these compounds contain a vinyl, $CH_2=CH-$ or a vinylidine group, $CH_2=C<$, and these can be used alone or in conjunction with each other, or with vinylene compounds $>CH=CH<$, which also can be used alone, such as maleic anhydride, and its half esters, and its diesters, such as the methyl, ethyl, propyl, butyl, etc. esters, and the corresponding fumaric esters; beta-cyano acrylic acid, its esters, and amides, fumaryl nitrile, etc.

In addition to the various ion exchange groups which can be present or subsequently attached to such grafted monomers, various metal-coordinating groups, such as disclosed in copending application, Serial No. 28,560, filed the same date herewith, and now abandoned, can be present in the grafting monomer or subsequently added.

In the practice of this invention, the monomer to be grafted preferably is absorbed by the peroxidized polymer, preferably crosslinked before grafting although crosslinking also can be effected during or subsequent to grafting. The monomer absorption usually is accomplished by contacting the polymer with the monomer, particularly if the monomer is an active swelling agent for the polymer. In those cases where the monomer is solid or is not an active swelling agent for the polymer, the use of an auxiliary organic compound to act as swelling agent for the polymer, as well as solvent for solid monomer, is advisable. These agents are usually the well-known ethers, alcohols, esters, ketones, chlorinated hydrocarbons, etc., the selection of which depends on the polymer, or monomer, or on both being used in a particular system. In some cases, such active swelling agents as dimethyl formamide, butyrolactone, dimethyl sulfoxide, etc., can be used. If the particular swelling agent being used is a retarder, or an inhibitor, or a chain transfer agent for the grafting reaction, then this swelling agent first is removed from the monomer-polymer mixture before the grafting is performed in the insoluble medium as described hereinabove. In other cases where the boiling point of the swelling agent is higher than about 50° C., as for example, benzene or toluene, it is not necessary to remove it from the swollen polymer before grafting the monomers. In the case of low boiling swelling agents, if the grafting of the monomers is effected under pressure, it becomes unnecessary to remove the swelling agents unless desired.

While room temperature is preferred for the absorption of monomer into or on the polymer, it is also satisfactory to use higher temperatures provided this temperature is not high enough to cause reaction between the polymer and the monomer. Depending on the particular materials being used, temperatures in the neighborhood of 30–40° C., or even as high as 50° C. in some cases, can be used. Such higher temperatures are advantageous in some cases in hastening the absorption. The temperature eventually used in effecting reaction between the polymer and monomer is selected according to the temperature at which the peroxide groups are decomposed in the presence of the monomer. Generally temperatures of about 60° C., preferably 70° C., or higher, will cause such reaction. While temperatures as high as 150° C. can be used without deleterious effects, the reaction generally can be promoted with sufficient speed without having to exceed 100° C.

The following examples are given to illustrate better various methods for the practice of this invention and are not intended in any way as a limitation on the methods of practicing the invention. Parts and percentages are by weight unless otherwise indicated.

Example I 1000 parts of polyethylene beads 1/16 inch in diameter are irradiated in air at room temperature in a tumbling barrel to a dose of 20 megareps. The peroxidized beads thereafter are immersed in styrene containing 5% of commercial 50% divinylbenzene at 25–30° C. until the increase in weight is 50%. The beads with the absorbed monomer are added to 1500 parts of water containing 10 parts of hydroxyapatite, 0.4 part of sodium dodecylbenzene sulfonate, and the dispersion heated while stirring to 75° C. for 14 hours, followed by heating at 90–95° C. for 24 hours. There is obtained an almost quantitative yield of tough crosslinked polymer beads having pendant

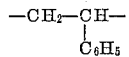

groups. The beads are recovered by filtration, washed with dilute HCl at a pH of 2–3, rewashed with water and dried.

Example II

Polymer beads of Example I are sulfonated as follows: 150 parts of the polymer beads are immersed in 100 parts of chlorosulfonic acid and heated with stirring at 60–70° C. until no more HCl is liberated. The mixture then is poured into a 30% $H_2SO_4$ solution, filtered, and the beads poured into a 10% $H_2SO_4$ solution, followed by a 3% $H_2SO_4$ solution. Then the beads are recovered by filtration. There is obtained a sulfonated cation exchange resin in bead form with the sulfonic acid groups concentrated on the bead surfaces.

The foregoing procedure is repeated using in place of the chlorosulfonic acid, a complex of $SO_3$ with bis-(beta-chloroethyl)-ether made by dissolving 645 parts of bis-(betachloroethyl)-ether in 4000 parts of ethylene dichloride and adding 200 parts of liquid $SO_3$ at −2 to −20° C. The solution of the complex is cooled to −20° C. and 150 parts of polymer beads added and the temperature raised slowly to about 15–20° C. for 30 minutes. The sulfonated beads are removed by filtration, added slowly to diluted sulfuric acid as above and steam-distilled to remove the retained ether and ethylene dichloride. Titration of the ion exchange resin with alkali confirms that substantially all of the grafted styrene (i.e., a ratio of 2 parts of polyethylene by weight to 1 part of styrene by weight) is sulfonated and available for ion exchange.

Example III

The polymer beads of Example I are converted to chloromethyl derivatives suitable for the preparation of anion exchange resins as follows: 100 parts of the polymer beads of Example I are suspended in 250 parts of ethylene dichloride for two hours; then 100 parts of monochloromethyl ether is added, after which 60 parts of anhydrous aluminum chloride is added over a period of two hours and stirring continued at 25–30° C. for six hours. The mixture is added to 3000 parts of ice water and the insoluble bead filtered off and washed with water.

Example IV

Twenty parts of the chloromethylated polymer of Example III are suspended in 40 parts of water and 50 parts of a 25% solution of trimethyl amine are added over a period of three hours, followed by additional heating with stirring at 25–30° C. for five hours. The beads are filtered off, washed with water and steam stripped to remove ethylene dichloride and ethers, and tough anion exchange resin beads are obtained.

Example V

The procedure of Example IV is repeated using an equivalent amount of dimethylethanol amine instead of trimethyl amine and there is obtained the corresponding anion exchange polymer.

Example VI

The procedure of Example IV is repeated using an equivalent amount of o-aminopyridine and there is obtained a polymer having pendant

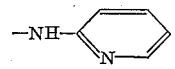

groups which functions as an anion exchange polymer as well as a chelating polymer.

Example VII

A spool containing 2000 parts of 400 denier polyethylene monofilament is irradiated by passing the filament through an irradiated field in air at room temperature to a dose of 25 megareps and is then immersed in styrene until the increase in weight is about 20%. The filament then is run slowly on thread-storage, thread-advancing reels immersed in a water bath at 90° C. for a residence time of 6 hours. Then 10 parts of dried filamentary graft copolymer is immersed in 10 parts of chlorosulfonic acid and heated at 60–70° C. until no more HCl is evolved. The sulfonated graft copolymer then is washed as in the procedure of Example II and there is obtained a filamentary cation exchange resin.

*Example VIII*

Fifty parts of a polyethylene foam sponge with an open pore structure of approximately 80 pores to the square inch is irradiated in air at room temperature to a dose of 24 megareps and immersed in styrene containing 5% of commercial divinylbenzene at 30° C. until the increase in weight is 5 parts. The sponge then is immersed for 14 hours in a water bath at 80° C. attached to a reciprocating arm that slowly lowers and raises the sponge within the water bath. The sponge is dried and immersed in excess chlorosulfonic acid at 60–70° C. until no more HCl is liberated. The sulfonated graft copolymer sponge is washed as in the procedure of Example II and there is obtained a tough sponge structure which has excellent cation exchange properties. When the sponge is shaped in the form of a rod and inserted in a cylinder or pipe or tube of suitable internal diameter, a snug fitting cation exchange sponge cartridge is obtained which can be used and regenerated without the attrition losses common to the regular bead or granular type ion exchange resin.

*Example IX*

The procedure of Example I is repeated using polypropylene beads intsead of polyethylene beads and converted to cation exchange resin by the procedure of Example II, anion exchange resins by the procedures of Examples III and IV, and to a chelating resin by the procedure of Example V, and similar results are obtained.

*Example X*

The procedure of Example IX is repeated using polybutene-1 and similar results are obtained.

*Example XI*

Polyethylene fibers are grafted with styrene as in Example VII and converted to anion exchange resins by the procedures of Examples III, IV, and V, and tough filamentary anion exchange resins are obtained.

*Example XII*

A polyethylene foamed sponge is grafted with styrene as in the procedure of Example VII and converted to anion and chelating resins by the procedures of Examples III, IV, and V, and used as cartridges as in Example VIII with excellent results.

*Example XIII*

Polypropylene fibers are used instead of the polyethylene fibers of Example XI and similar results are obtained.

*Example XIV*

A polypropylene foam sponge is used instead of a polyethylene sponge of Example XII and identical results are obtained.

*Example XV*

Fifty parts of polyethylene beads 1/32 inch in diameter are irradiated in air at room temperature in a tumbling barrel with 18–20 megarep dose and thereafter immersed in a 50% mixture of $CH_2=CHC_6H_5CH_2N(COOC_2H_5)_2$ and ethyl ether, as a swelling solvent, until the increase in weight is about 38%. The ether is allowed to evaporate from the beads and they are added to 75 parts of water containing 0.5 part of hydroxy apatite, 0.01 part of sodium dodecylbenzenesulfonate and the dispersion maintained at 85–95° C. for 72 hours. The beads then are isolated by filtration, hydrolyzed with a 10% alcoholic NaOH solution, and subsequently washed with water to remove free alkali. Tough beads containing chelating iminoacetic acid groups are obtained which remove copper ions when a 3% sodium chloride solution containing 1% of cupric ion is passed through a column of these beads. When the copper coordinated resin is washed with 2 N hydrochloric acid, a solution of cupric chloride is recovered from the resin. By substituting other acids for the hydrochloric acid, such as nitric, sulfuric, phosphoric, etc., the corresponding copper nitrate, sulfate, or phosphate, etc., is recovered instead of cupric chloride.

When a correspondingly larger amount of solution containing 0.1% cupric ion instead of 1% is used in this example, a similar recovery of metal is obtained. Substantially, all of the metal is recovered from similar solutions containing a lower concentration of copper ions, for example, in a 3% sodium chloride solution containing 250 parts per million, 100 parts per million, and 5 parts per million respectively, of copper ion. Recovery of copper is also obtained from solutions containing other alkali and alkaline earth salts, such as potassium, lithium, magnesium, calcium, and strontium, such as their chlorides, nitrates, sulfates, phosphates, and acetates. For example, all of the copper is recovered from a 15% calcium chloride solution having 25 p.p.m. of copper ions.

*Example XVI*

The procedure of Example XV is repeated with cobaltic chloride solutions and the metal is recovered in a similar manner. During the process the chelating polymer becomes red when it reacts with the cobalt ions. When solutions of aluminum, cesium, lanthanum, chromium, manganous, manganic, tantalum, zirconium, titanium, and uranium ions are used instead of copper or cobalt ions, they also are recovered in a similar manner.

*Example XVII*

The grafting procedure of Example XV is repeated using acetamidostyrene, $CH_3CONHC_6H_4CH=CH_2$, as the grafting monomer. Hydrolysis of the grafted polymer results in free amino groups and the polymer is used in the recovery of nickel from nickel solutions. When

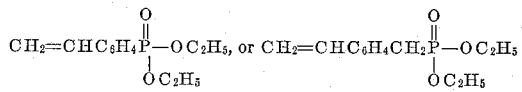

is used instead of the acetamidostyrene, and the graft polymer hydrolyzed, there is obtained a high capacity ion exchange resin instead of a coordination resin.

*Example XVIII*

The polymer of Example XVII containing units of the structure

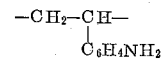

is diazotized by the method of Skogseid (A. Skogseid, 1948 Dissertation, Aas and Wahle, Norway), and reacted respectively with (a) salicyclic acid to give

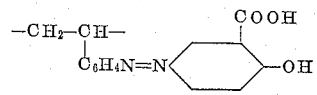

groups, (b) catechol to give

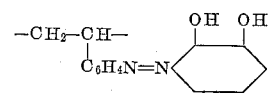

groups, (c) hydroxyacetophenone to give

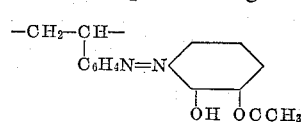

groups, and (d) 2-hydroxy dimethyl aniline to give

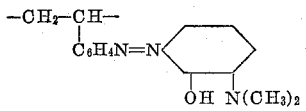

groups. Each of these polymers recovers copper and other heavy metals when used according to the procedures of Examples XV and XVI.

*Example XIX*

Fifty parts of distilled water, 0.5 part of hydroxy apatite (0.005 to 0.2 micron size), 0.1 part of sodium dodecylbenzenesulfonate, 0.1 part of benzoyl peroxide, 2.5 parts of commercial divinylbenzene (approximately 50% DVB–50% ethyl styrene), and 35 parts of isopropyl styrene are mixed in a suitable reaction flask and stirred for 16 hours at 90° C., following which the mixture is cooled to 25° C. and 10% of cumene hydroperoxide added, and the suspension heated to 35–45° C. for 5 hours. The beads are removed by filtration, washed with 3–100 part portions of methyl alcohol and dried in vacuum. Crosslinked beads containing peroxy groups are obtained which can be used for grafting various monomers to the beads; or the peroxidized beads can be left in the dispersion and the monomer grafted directly therein.

*Example XX*

One hundred and forty parts of water, 1.0 part of hydroxyapatite (0.005 to 0.2 micron size); 0.02 part of dodecylbenzenesulfonate, 0.2 part of benzoyl peroxide, 60 parts of commercial divinylbenzene (approximately 50% DVB–50% ethyl styrene), and 50 parts of styrene are mixed at room temperature and a steady stream of air passed into the dispersed system through a 1⁄32 inch capillary for 2 hours. While the air and stirring are continued, the temperature is raised to 60° C. and maintained there for 16 hours. Then the air flow is terminated, and the temperature raised to 70° C. and maintained for 18 hours. Crosslinked, peroxidized beads are obtained.

*Example XXI*

Fifty parts of styrene, 2.6 parts of commercial divinylbenzene (approximately 50% DVB–50% ethyl styrene), and 45 parts of acrylyl chloride, 1 part of alpha,alpha′-azobisisobutyronitrile are heated for 12 hours at 45° C., 18 hours at 60° C., 18 hours at 80° C., and 24 hours at 100° C., following which the hard copolymer is ground to small granules and washed with 5–100 part portions of dry heptane. The particles then are added to 400 parts of dry heptane to which is added 50 parts of tertiary butyl hydroperoxide and 98 parts of tributyl amine, and the mixture stirred for 24 hours at room temperature. The granules of peroxidized polymer are removed by filtration, immersed in 5–300 part portions of ethyl alcohol, filtered and dried at 30–40° C. at reduced pressure.

*Example XXII*

The peroxidized polymer of Example XIX is dispersed in a mixture of 0.5 part of hydroxy apatite (0.005 to 0.2 micron size), 0.1 part of sodium dodecylbenzenesulfonate, and 80 parts of distilled water. To this mixture is added 10 parts of acrylonitrile and the dispersed mixture stirred for 10 hours, following which it is maintained at 70° C. for 24 hours. Then there is added 1.0 part of hydrazine and the mixture is stirred for 3 hours at room temperature. The beads are removed by filtration and dried for 3 hours at 70° C., 10 hours at 90° C., and 2 hours at 120° C. There is obtained a grafted insoluble copolymer having in the grafted side chains the structure

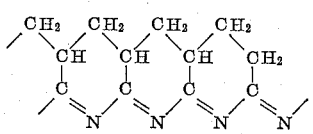

This copolymer coordinates readily with copper ions.

*Example XXIII*

Twenty-five parts of the peroxidized crosslinked copolymer beads of Example XX are immersed in methyl vinyl ketone until the increase in weight is 10 parts, following which the beads are dispersed in 100 parts of glycerine and heated to 80° C. for 24 hours. The beads are removed by filtration, washed with water, immersed in a 5% solution of hydroxylamine for 24 hours, then removed by filtration, and dried at 70° C. A grafted copolymer is obtained which contains

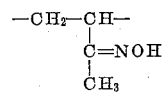

structures, and the polymer forms coordination compounds with nickel ions. When other chelating monomers, such as $$CH_2=CHCOOCH_2CH_2N(CH_2COOH)_2$$

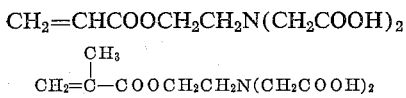

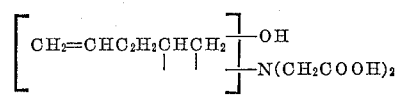

are grafted in a similar way, the corresponding chelating polymers are obtained.

*Example XXIV*

The procedure of Example XXIII is repeated using the polymer of Example XXI instead of the polymer of Example XX, and similar results are obtained.

*Example XXV*

The procedure of Example XXI is repeated using equivalent amounts of methyl methacrylate, ethylene glycol diacrylate, and methacrylyl chloride in place of the styrene, divinylbenzene, and acrylyl chloride respectively. The product then is reacted according to the procedure of Example XXIII and a chelating polymer is similarly produced.

*Example XXVI*

The procedure of Example XIX is repeated using equivalent amounts of vinyl isopropyl naphthalene and divinyl toluene in place of the isopropyl styrene and divinylbenzene, respectively. The product is reacted further according to the procedure of Example XXII to produce a satisfactory chelating polymer.

*Example XXVII*

The procedure of Example XX is repeated using equivalent amounts of vinyl acetate and vinyl acrylate, respectively, in place of the styrene and divinylbenzene. The product then is reacted according to the procedure of Example XXIII to give a chelating polymer.

*Example XXVIII*

The procedure of Example XV is repeated twice, using in one case an equivalent amount of 66 nylon beads (polyhexamethylene adipamide) containing 5 parts commercial divinyl benzene (50% divinyl benzene) and polytetramethylene sebacate, respectively, in place of the polyethylene. In the subsequent grafting step, the corresponding monomer acid is used instead of the monomer ester and the hydrolysis step is omitted. The final product has good chelating properties.

In cases where the monomer is insoluble or only slightly soluble in the suspension medium, it is possible to effect the absorption of monomer by the polymer by suspending both in the suspension medium and agitating until the monomer has been absorbed into the polymer. It is generally desirable in such cases that only the desired amount of monomer be so suspended and that a predominant proportion or preferably substantially all of the monomer be pre-absorbed on the polymer before the temperature is raised to effect grafting. The grafting of long polymer chains from monomer concentrated in the suspension medium is thereby avoided. In this way, the monomer grafting is distributed more uniformly through the polymer and appears in a greater number of shorter, grafted chains.

In the preparation of the peroxidized polymers for the practice of this invention, the preformed polymers or the polymers formed during the processing steps can be of the addition type, such as derived from the various vinyl and vinylidene monomers illustrated herein. Methods A and C also can use condensation polymers, such as polyamides, polyesters, polyurethanes, polyethers, polyamines, etc.

In using Method A on such condensation polymers, it is desirable that there be a considerable portion of aliphatic hydrocarbon groups therein, since these are more susceptible to peroxide formation.

In using Method C on such condensation polymers, it is necessary that the polymers have secondary carbon atoms, that is those having one hydrogen atom attached thereto, so that the hydroperoxides and diperoxides can be formed.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. The process of preparing graft copolymers which comprises absorbing a water-insoluble monomer having at least one $CH_2=C<$ group into a peroxidized synthetic organic polymer in solid undissolved form at a non-reactive temperature, separating said solid polymer from excess non-absorbed monomer, and thereafter heating said polymer with absorbed monomer in a non-reactive aqueous medium to cause reaction between said polymer and said monomer.

2. The process of preparing a cation exchange resin which comprises absorbing a vinyl aryl monomer on a crosslinked peroxidized polyolefin in solid undissolved form, separating said solid polyolefin from excess non-absorbed monomer, heating the resultant solid polymer with absorbed monomer in a non-reactive aqueous medium, and thereafter sulfonating the resultant graft copolymer.

3. The process of claim 2 in which said vinyl aryl monomer is styrene.

4. The process of claim 3 in which said polyolefin is polyethylene.

5. The process of claim 3 in which said polyolefin is polypropylene.

6. The process of preparing an anion exchange resin which comprises absorbing a vinyl aryl monomer on a crosslinked peroxidized polyolefin in solid undissolved form, separating said solid polyolefin from excess non-adsorbed monomer, heating the resultant solid polymer with absorbed monomer in an aqueous medium, and thereafter aminating the resultant graft copolymer.

7. The process of preparing an anion exchange resin which comprises absorbing a vinyl aryl monomer on a crosslinked peroxidized polyolefin in solid undissolved form, separating said solid polyolefin from excess non-adsorbed monomer, heating the resultant solid polymer with absorbed monomer in an aqueous medium, chloromethylating the resultant graft copolymer, and then reacting the chloromethylated graft copolymer with an amine.

8. The process of claim 7 in which the vinyl aryl monomer is styrene, the polyolefin is polyethylene, and the amine is trimethyl amine.

9. The process of preparing a chelating resin which comprises absorbing on a crosslinked peroxidized polyolefin in solid undissolved form a monomer having a $CH_2=C<$ group, separating said solid polymer from any non-absorbed monomer, heating the resultant solid polymer with absorbed monomer in an aqueous medium, and subsequently attaching to the resultant grafted copolymer a metal-coordinating group.

10. The process of preparing an anion exchange resin which comprises absorbing a vinyl aryl monomer on a crosslinked peroxidized polyolefin in solid undissolved form, separating said solid polyolefin from excess non-adsorbed monomer, heating the resultant solid polymer with absorbed monomer in an aqueous medium, subsequently chloromethylating the resultant graft copolymer, and reacting the chloromethylated graft copolymer with an aminoacetic acid.

11. The process of claim 10 in which the amino acid is glycine.

12. The process of claim 10 in which the amino acid is iminoacetic acid.

13. The process of claim 10 in which the amino acid is aspartic acid.

14. The process of claim 1 in which the peroxidized polymer is a crosslinked polymer of a vinyl aryl compound.

15. The process of claim 14 in which the vinyl aryl compound is styrene.

16. The process of claim 14 in which said peroxidized polymer is a copolymer of styrene and divinylbenzene.

17. The process of claim 14 in which said grafting monomer has a metal-coordinating group therein.

References Cited by the Examiner

UNITED STATES PATENTS

| 2,746,944 | 5/1956 | Naps | 260—45.5 |
| 2,837,496 | 6/1958 | Vandenberg | 260—2.2 |
| 2,907,675 | 10/1959 | Gaylord | 260—45.5 |
| 2,910,445 | 10/1959 | Mock | 260—2.1 |
| 3,133,889 | 5/1964 | Hayenberg | 260—2.2 |

FOREIGN PATENTS

| 563,237 | 6/1958 | Belgium. |
| 580,203 | 7/1958 | Italy. |

OTHER REFERENCES

Chemical Age (August 9, 1958), page 223.
Metz: Nucleonics, 16, pages 73–77 (April 1958).

WILLIAM H. SHORT, *Primary Examiner.*

HAROLD BURSTEIN, *Examiner.*

H. N. BURSTEIN, J. T. MARTIN, *Assistant Examiners.*